United States Patent
Gartner

(12) 
(10) Patent No.: US 11,173,998 B1
(45) Date of Patent: Nov. 16, 2021

(54) HANS BELL HOUSING FOR INFLATING AND DEFLATING A BALLOON ENVELOPE

(71) Applicant: Aerostar International, Inc., Sioux Falls, SD (US)

(72) Inventor: Keegan Gartner, San Jose, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 71 days.

(21) Appl. No.: 16/523,064

(22) Filed: Jul. 26, 2019

Related U.S. Application Data

(63) Continuation of application No. 15/393,594, filed on Dec. 29, 2016, now Pat. No. 10,435,132, which is a continuation of application No. 13/951,551, filed on Jul. 26, 2013, now Pat. No. 9,534,504.

(51) Int. Cl.
| | |
|---|---|
| *F01D 15/00* | (2006.01) |
| *B64B 1/62* | (2006.01) |
| *F01D 5/04* | (2006.01) |
| *B64B 1/60* | (2006.01) |
| *F01D 25/24* | (2006.01) |
| *B64B 1/64* | (2006.01) |

(52) U.S. Cl.
CPC .................. *B64B 1/62* (2013.01); *B64B 1/60* (2013.01); *B64B 1/64* (2013.01); *F01D 5/04* (2013.01); *F01D 15/00* (2013.01); *F01D 25/24* (2013.01)

(58) Field of Classification Search
CPC .... B64B 1/62; B64B 1/60; B64B 1/64; F01D 5/04; F01D 15/00; F01D 25/24
See application file for complete search history.

(56) References Cited

U.S. PATENT DOCUMENTS

| | | | |
|---|---|---|---|
| 1,362,578 A | 12/1920 | Kraft | |
| 5,645,248 A | 7/1997 | Campbell | |
| 6,648,272 B1 | 11/2003 | Kothmann | |
| 7,156,342 B2 | 1/2007 | Heaven, Jr. et al. | |
| 7,487,936 B2 | 2/2009 | Heaven, Jr. | |
| 7,843,076 B2* | 11/2010 | Gogoana | F15B 1/024 290/42 |
| 2006/0065777 A1 | 3/2006 | Walden et al. | |
| 2008/0135678 A1 | 6/2008 | Heaven | |
| 2009/0072082 A1* | 3/2009 | Arel | B64B 1/30 244/66 |
| 2009/0114768 A1 | 5/2009 | Voorhees | |
| 2013/0062457 A1 | 3/2013 | Deakin | |
| 2013/0062458 A1* | 3/2013 | Shenhar | B64B 1/62 244/31 |

OTHER PUBLICATIONS

"U.S. Appl. No. 13/951,551, Notice of Allowance dated Aug. 29, 2016", 14 pgs.
"U.S. Appl. No. 15/393,594, Notice of Allowance dated Jun. 21, 2019", 8 pgs.

\* cited by examiner

*Primary Examiner* — Aaron R Eastman
(74) *Attorney, Agent, or Firm* — Schwegman Lundberg & Woessner, P.A.

(57) ABSTRACT

A fixed housing that is configured to be coupled to a balloon envelope and an impeller housing disposed within the fixed housing, wherein the impeller housing and the fixed housing form a seal in a closed position, wherein the impeller housing is moveable into the balloon envelope relative to the fixed housing in an open position, and wherein the impeller housing defines an unobstructed airflow passageway between an internal chamber in a balloon envelope and the atmosphere in the open position.

20 Claims, 12 Drawing Sheets

HANS BELL HOUSING FOR INFLATING AND DEFLATING A BALLOON ENVELOPE

CROSS-REFERENCE TO RELATED APPLICATION

This application is a continuation of U.S. patent application Ser. No. 15/393,594, filed on Dec. 29, 2016, which is a continuation application of U.S. patent application Ser. No. 13/951,551, filed Jul. 26, 2013 and issued as U.S. Pat. No. 9,534,504 on Jan. 3, 2017, the disclosures of which are incorporated herein by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, an apparatus is provided having (a) a fixed housing that is securable to a balloon envelope, (b) an impeller housing comprising an impeller, wherein the impeller housing is at least partially disposed within the fixed housing, wherein the impeller housing comprises a plurality of vents, wherein an airflow passageway is defined from inside the impeller housing through the plurality of vents, and wherein the impeller housing is moveable between a closed position and an open position, (c) one or more actuators configured to move the impeller housing between the closed position and the open position, (d) wherein the impeller housing and the fixed housing are arranged such that, when the impeller housing is in the closed position, the impeller housing seals an interior volume of a chamber within the balloon envelope that is securable to the fixed housing, and (e) wherein the impeller housing and the fixed housing are further arranged such that when the impeller housing is in the open position the impeller housing extends into and opens the airflow passageway to the interior volume of the chamber within the balloon envelope that is securable to the fixed housing.

In a further aspect, an apparatus is provided having (a) a fixed housing that is configured to be coupled to a balloon envelope, and (b) an impeller housing disposed within the fixed housing, wherein the impeller housing and the fixed housing form a seal in a closed position, wherein the impeller housing is moveable into the balloon envelope relative to the fixed housing in an open position, and wherein the impeller housing defines an unobstructed airflow passageway between an internal chamber in a balloon envelope and the atmosphere in the open position.

In another aspect, an apparatus is provided having (a) an impeller housing comprising a hollow cylindrical body with a first end and a second end, (b) a plate having a periphery that is coupled to the first end of the impeller housing, wherein a flange extends radially outward from the impeller housing below the plate, (c) a plurality of vents defined in the impeller housing between the plate and the flange, wherein an airflow passageway is defined from the second end of the impeller housing through the hollow cylindrical body of the impeller housing to the plurality of vents, and (d) an impeller disposed within the impeller housing between the first end and the second end of the impeller housing.

In an additional aspect, a method is provided including the steps of (a) operating a control system for a balloon comprised of a fixed housing that is configured to be coupled to a balloon envelope and an impeller housing disposed within the fixed housing, wherein the impeller housing and the fixed housing form a seal in a closed position, wherein the impeller housing is moveable into the balloon envelope relative to the fixed housing in an open position, and wherein the impeller housing defines an unobstructed airflow passageway between an internal chamber in a balloon envelope and the atmosphere in the open position, (b) receiving a signal to increase or decrease an amount of air within the balloon envelope, (c) spinning the impeller, (d) causing one or more actuators to move the impeller housing from the closed position to the open position, and (e) moving air between the balloon envelope and the atmosphere.

In a further aspect, a non-transitory computer readable medium is provided having stored therein instructions executable by a computing device to cause the computing device to perform functions comprising (a) operating a control system for a balloon comprised of a balloon envelope, a fixed housing secured to the balloon envelope, wherein the fixed housing comprises an open-ended, hollow cylinder defining a first plurality of vents in a cylindrical sidewall, wherein the fixed housing has an open first end that has a periphery and a closed second end that defines an aperture, an impeller housing partially disposed within the fixed housing and extending through the aperture of the fixed housing, wherein the impeller housing comprises a hollow cylindrical body with a first end and a second end, a plate having a periphery is coupled to the first end of the impeller housing, wherein a flange extends radially outward from the impeller housing below the plate, a second plurality of vents are defined in the impeller housing between the plate and the flange, wherein an airflow passageway is defined from the second end of the impeller housing through the hollow cylindrical body of the impeller housing to the second plurality of vents, an impeller disposed within the impeller housing between the first end and the second end of the impeller housing, and one or more actuators in mechanical communication with the flange of the impeller housing, wherein the plate is movable from a closed position to an open position, wherein the periphery of the plate mates with the periphery of the first end of the fixed housing to form a seal in the closed position, and wherein the plate and at least a portion of the second plurality of vents extend into the balloon envelope in the open position providing fluid communication between atmosphere and an internal chamber of the balloon envelope via the airflow passageway, (b) receiving a signal to increase or decrease an amount of air within the balloon envelope, (c) spinning the impeller, (d) causing the one or more actuators to move the impeller housing from the closed position to the open position, and (e) moving air between the balloon envelope and the atmosphere.

In a further aspect, a balloon is provided having a balloon envelope and a bladder within the balloon envelope and means for filling and venting air from the bladder within the balloon envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
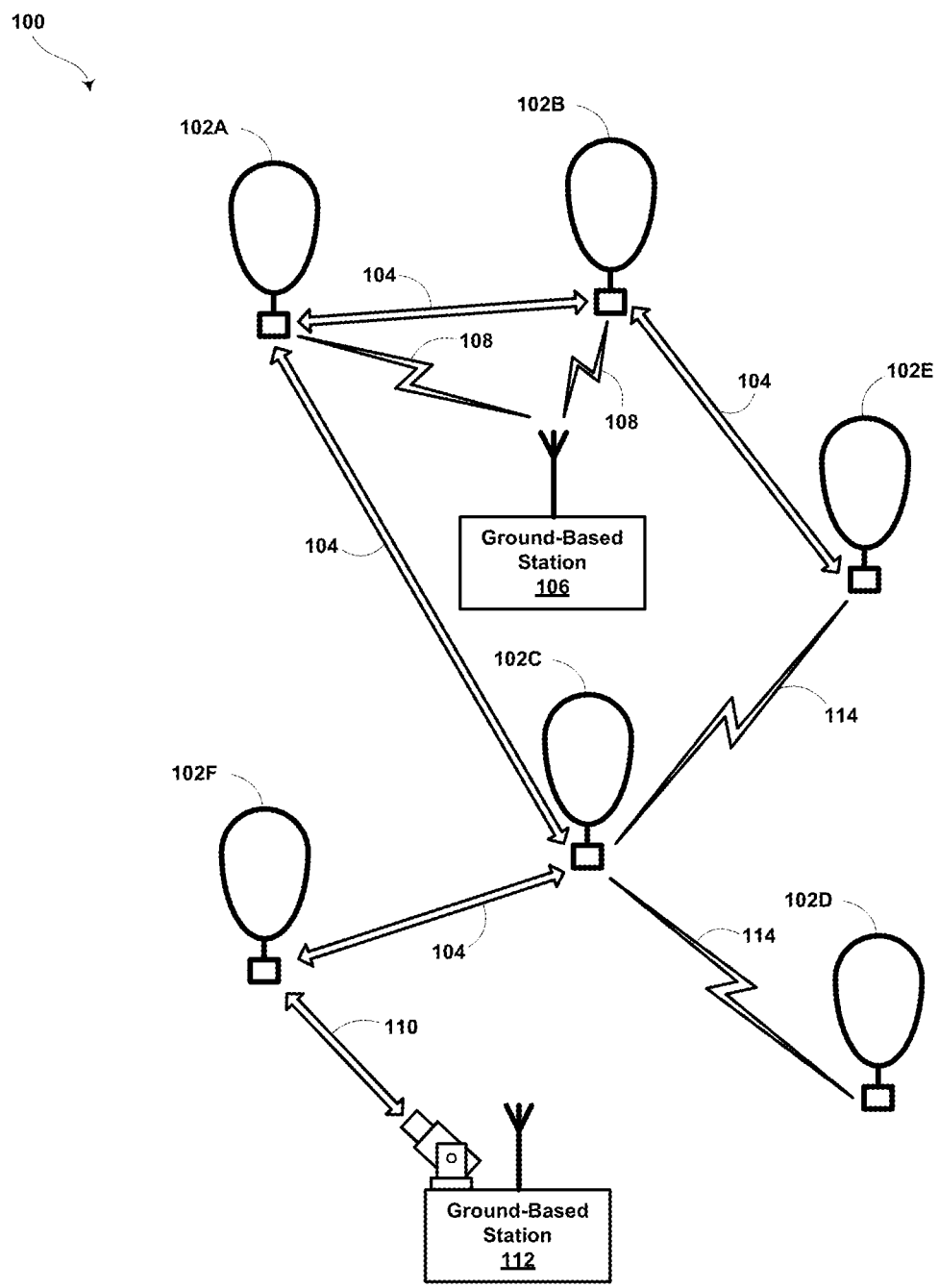
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able to find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

Exemplary embodiments may be implemented in association with a data network that includes a plurality of balloons. In an exemplary embodiment, such balloons may include an envelope, a payload, and an air mass fill and release mechanism.

The balloon envelope may be filled with a lifting gas such as helium or hydrogen to provide a lifting force to keep the balloon aloft. One method of controlling the altitude of the balloon is by controlling the amount of lifting gas that is within the balloon envelope. With this method of altitude control, lifting gas may be released from the balloon envelope to reduce the lifting force and lower the balloon, or added to the balloon envelope to increase the lifting force and raise the balloon. However, there may be a finite amount of lifting gas available and it may therefore be undesirable to release lifting gas from the balloon envelope to the atmosphere. Therefore, it would be desirable to provide a means for controlling the altitude of a balloon that did not require releasing or adding lifting gas to the balloon envelope.

In the present disclosed embodiments, the altitude of a balloon may be controlled by controlling the amount of air, and thus the mass of air, that is positioned within the balloon envelope. In particular, the altitude of the balloon may be increased by reducing the amount of air within the balloon envelope, which in turn reduces the mass of air within the balloon and overall weight of the balloon. Such a reduction in air mass may be desirable at night when the environmental temperatures are low and the temperature of the lifting gas within the balloon envelope is reduced.

Conversely, the altitude of the balloon may be lowered by increasing the amount of air within the balloon envelope, which in turn increases the mass of air mass within the balloon and the overall weight of the balloon. Such an increase in air mass may be desirable during the day when the environmental temperatures are high and the temperature of the lifting gas within the balloon envelope is increased.

An air-filled bladder, which may also be referred to as a ballonet, may be positioned within the balloon envelope. As noted above, the altitude of the balloon may be controlled by controlling the amount, and therefore the mass, of air within the bladder. When it is desired to the lower the altitude of the balloon, additional air may be added to the bladder to increase the overall weight of the balloon resulting in lowering the altitude of the balloon. Conversely, when it is desired to raise the altitude of the balloon, air may be removed from the bladder to reduce the overall weight of the balloon resulting in raising the altitude of the balloon. By utilizing a bladder, the amount of lifting gas in the remaining portion of the balloon envelope is unaffected as the air mass and density is altered.

The present embodiments provide an air mass fill and release mechanism that may be used to force air into or out of the bladder of the balloon to change the amount of air mass within the bladder and to change the overall weight of the balloon when desired, without venting lifting gas. The air mass fill and release mechanism includes an impeller housing disposed within a fixed housing, which in turn is coupled to the balloon envelope. The impeller housing is moveable relative to the fixed housing. The impeller housing and the fixed housing form a seal in a closed position, whereas, in an open position, the impeller housing defines an unobstructed airflow passageway between an internal chamber in a balloon envelope and the atmosphere. Air may be forced into the bladder with a pump or impeller disposed in the impeller housing. Alternatively, air may be forced out of the bladder with the pump or impeller or the air may simply exit due to the pressure differential between the bladder and atmosphere.

The present embodiments advantageously provide a fill mechanism that utilizes the impeller or pump only intermittently to adjust the air mass within the balloon. This intermittent use allows the balloon to conserve power. In addition, the impeller housing creates efficiencies in air flow by providing both an airflow seal and an unobstructed airflow passageway between the balloon envelope and the atmosphere. Specifically, in various embodiments, the impeller housing comprises a hollow cylindrical body with a first end and a second end and a plate having a periphery is coupled to the first end of the impeller housing. A flange extends radially outward from the impeller housing below the plate. A plurality of vents are defined in the impeller housing between the plate and the flange, and the airflow passageway is defined from the second end of the impeller housing through the hollow cylindrical body of the impeller housing to the second plurality of vents. An impeller or a pump is disposed within the impeller housing between the first end and the second end of the impeller housing.

In operation, the plate is movable relative to the fixed housing from a closed position to an open position. For example, the periphery of the plate mates with the periphery of the first end of the fixed housing to form a seal in the closed position. In the open position, the plate and at least a portion of the plurality of vents in the impeller housing extend into the balloon envelope. This open position provides fluid communication between atmosphere and an internal chamber of the balloon envelope via the airflow passageway in the impeller housing.

Further, when it is desired to add air to the bladder, the impeller is turned on and air is forced towards the sealing plate prior to moving the impeller housing into the open position. This prevents air in the balloon envelope from prematurely evacuating. The fixed housing beneficially provides a plurality of vents in its sidewall to alleviate airflow back pressure on the impeller or pump before the impeller housing is moved into the open position. Once the spinning impeller reaches operating speed, one or more actuators are activated. Activating the actuators causes the impeller housing to disengage from the periphery of the first end of the fixed housing. As a result of this disengagement, the seal between the plate and the fixed housing is opened allowing air to move through the airflow passageway between the atmosphere and the balloon. The operating speed of the impeller is calculated such that the force of the resulting airflow is greater than the force of the air mass acting on the top surface of the plate (e.g., back pressure from the bladder). When a desired quantity of air has been moved into the bladder, the actuators are activated to lower the impeller housing, while the impeller is still spinning.

Alternatively, when air is to be moved out of the bladder, the impeller may be spun prior to activation of the actuators to counteract the force from the air mass in the balloon envelope acting upon the plate or the force applied by the actuators may be calculated to overcome the force of the air mass in the balloon acting upon the plate. Once the actuators have moved the plate into the open position, the impeller is stopped and air is allowed to flow from the interior chamber of the balloon envelope through the passageway and into the atmosphere. As air flows out, the impeller may spin in the forward or the reverse direction and this mechanical energy may be advantageously captured by an energy conversion device in some embodiments. When a desired quantity of air is moved out of the balloon envelope, the actuators are activated and back-driven to move the plate into the closed position.

Further, the structure of the fixed and impeller housings have the added benefit of being capable of being made out of plastic in some embodiments, unlike other high-speed air compressors. Plastic compressors contract at a different rate than aluminum compressors at low temperatures. So manufacturing both the fixed housing and impeller housing from plastic allows for a tight fit with one another and without having to remove some material to account for operating temperatures.

2. Example Balloon Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

2a) Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

2b) Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

2c) Control of Balloons in a Balloon Network

Figure 2:
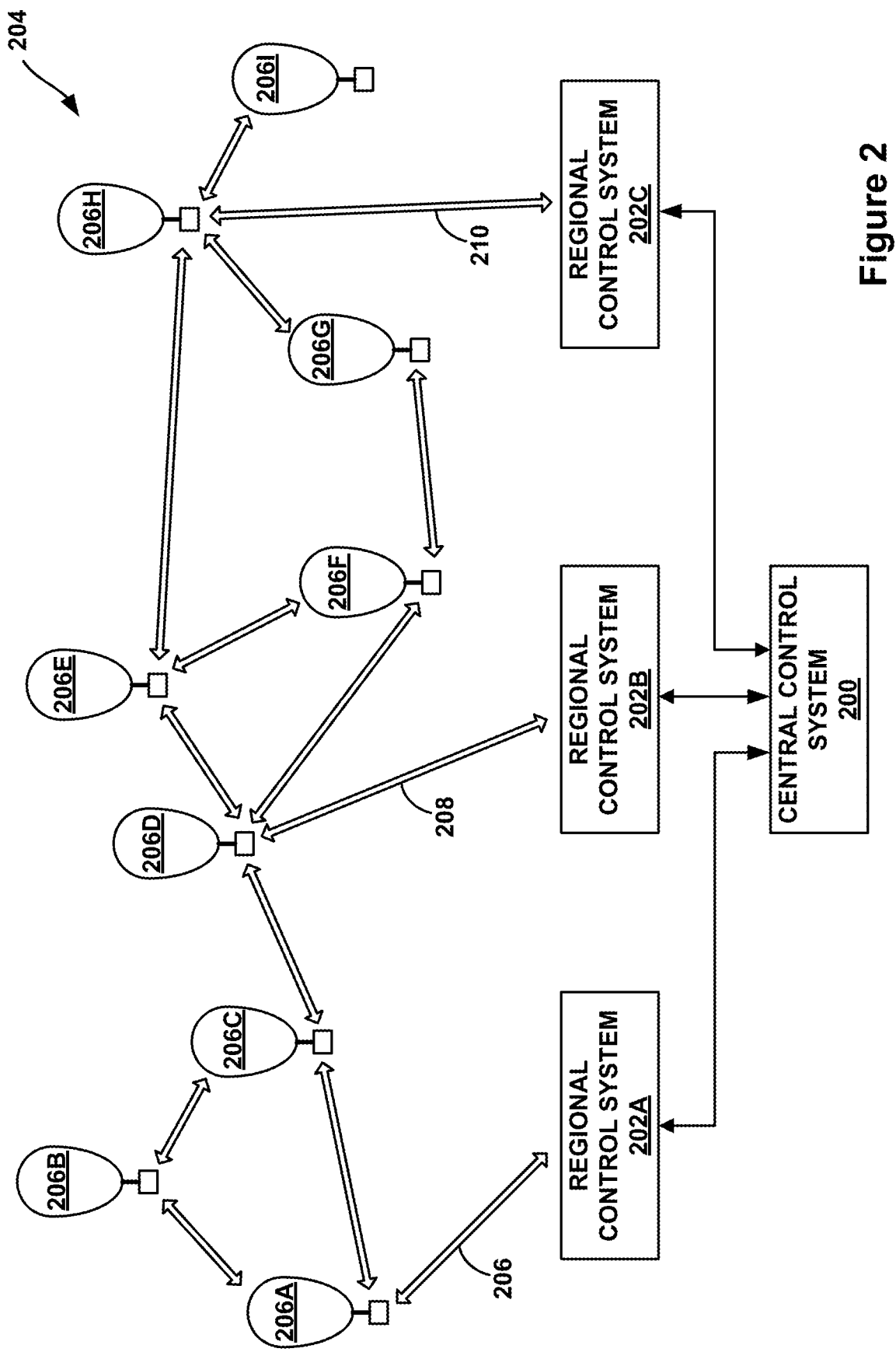
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

2d) Example Balloon Configuration

Figure 3:
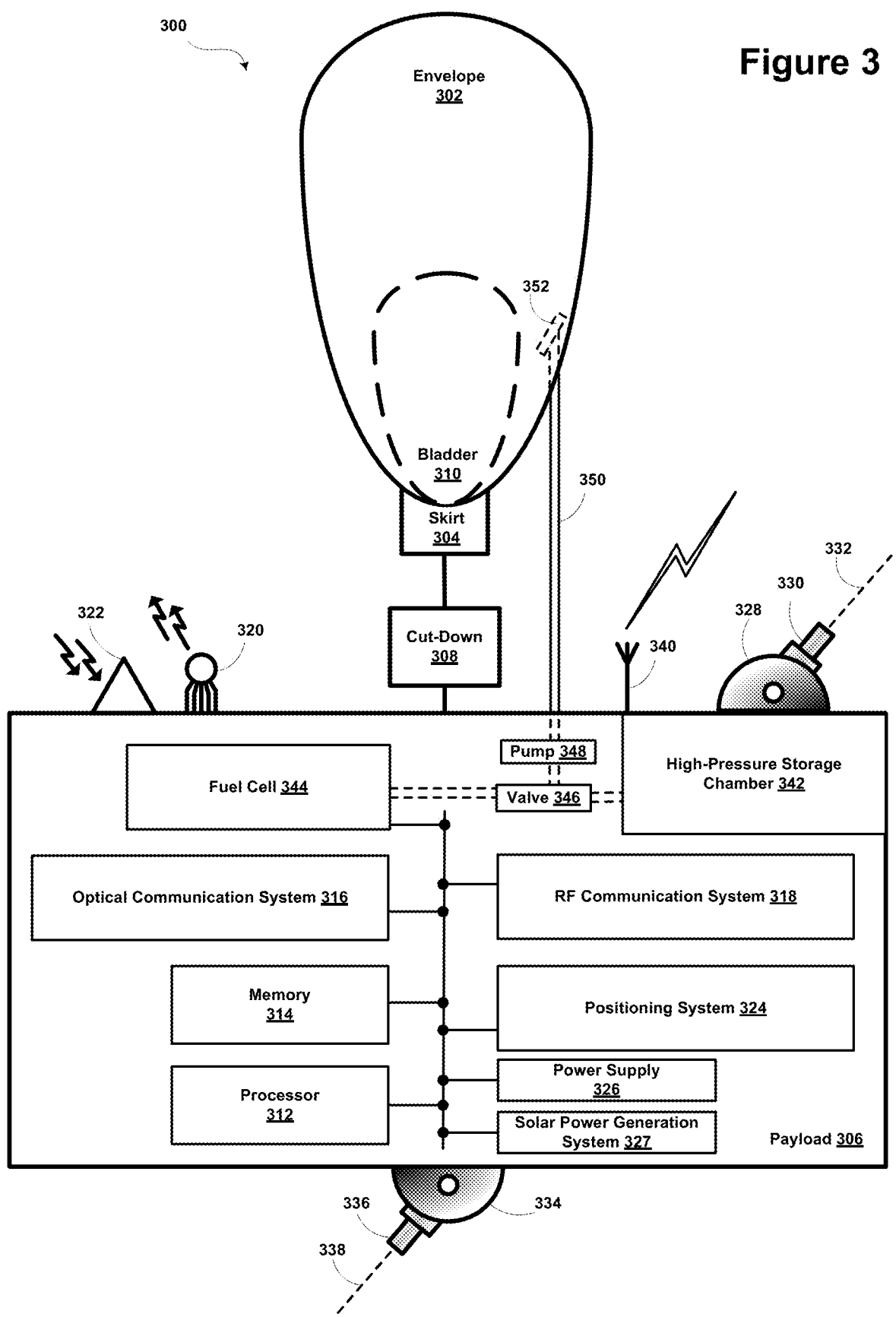
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

3. Examples of an Air Mass Fill and Release Mechanism

The present embodiments advantageously provide an air mass fill and release mechanism that includes an impeller housing that acts as both a seal and an air flow valve. Referring now to FIGS. 4-8, a balloon 10 is shown having a balloon envelope 12 and a bladder 16 positioned within the balloon envelope 12. A sealed lift gas compartment is maintained between the balloon envelope and the bladder 16. In an alternative embodiment, the balloon envelope 12 may comprise a single chamber. An air mass fill and release mechanism 20 is securable below the balloon envelope 16. The payload 14 is mounted to a flange secured along the bottom of the balloon envelope 12 and the air mass fill and release mechanism 20 is disposed within and through the payload 14.

The air mass fill and release mechanism 20 includes a fixed housing 24 that is securable to a balloon envelope 12 and an impeller housing 38 comprising an impeller 50. The impeller housing 38 is at least partially disposed within the fixed housing 24. The impeller housing 38 comprises a plurality of vents 48 such that an airflow passageway is defined from inside the impeller housing 38 through the plurality of vents 48. The impeller housing 38 is moveable between a closed position 56 and an open position 58. One or more actuators 52 are configured to move the impeller housing 38 between the closed position 56 and the open position 58. The impeller housing 38 and the fixed housing 24 are arranged such that, when the impeller housing 38 is in the closed position 56, the impeller housing 38 seals an interior volume of a chamber 16 within the balloon envelope 12 that is securable to the fixed housing 24. The impeller housing 38 and the fixed housing 24 are further arranged such that when the impeller housing 38 is in the open position 58 the impeller housing 38 extends into and opens the airflow passageway to the interior volume of the chamber 16 within the balloon envelope 12 that is securable to the fixed housing 24.

Figure 4:
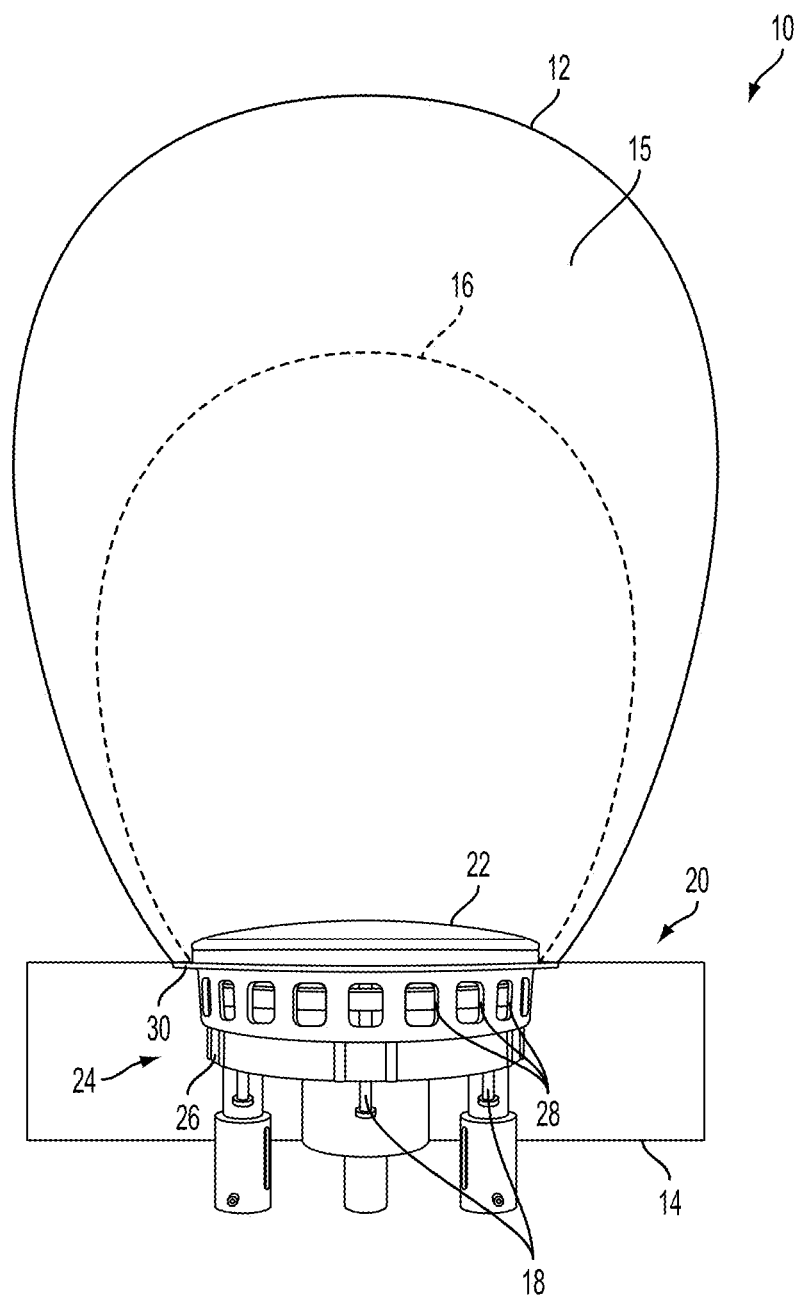
FIG. 4 shows a perspective view of a balloon having an air mass fill and release mechanism positioned beneath the balloon envelope and above the payload, according to an example embodiment.
Figure 5:
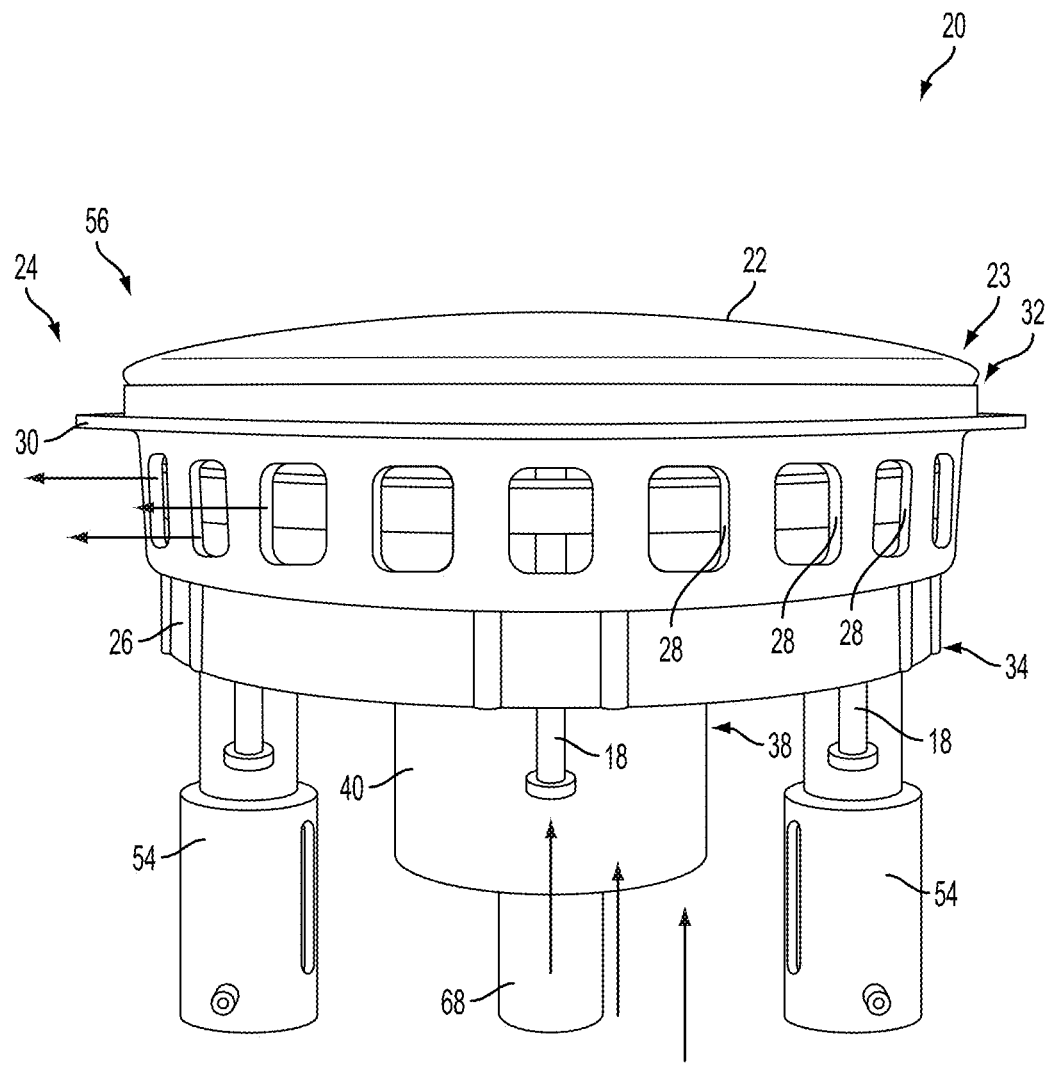
FIG. 5 shows a side view of the air mass fill and release mechanism shown in FIG. 4, according to an example embodiment, in a closed position.
Figure 6:
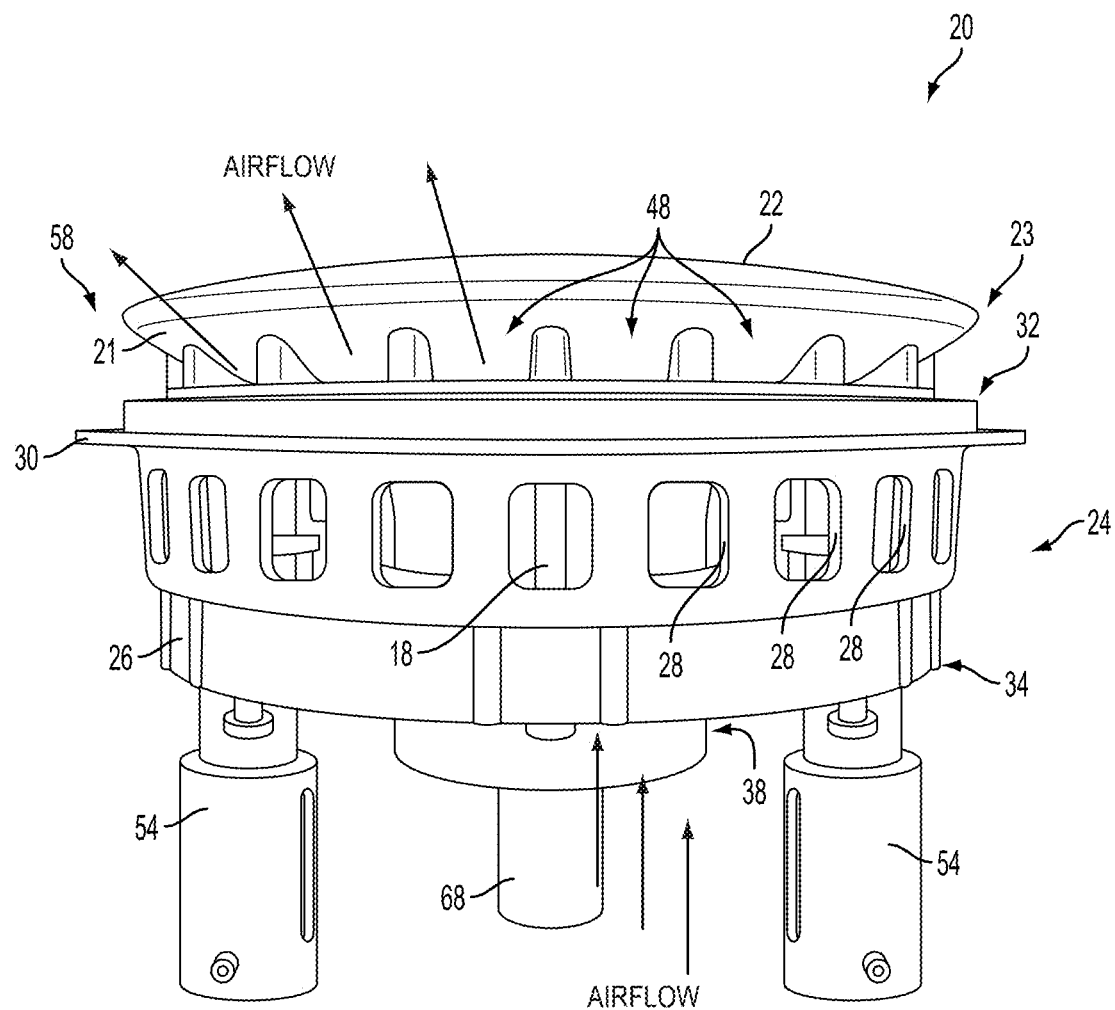
FIG. 6 shows a side view of the air mass fill and release mechanism shown in FIGS. 4 and 5, according to an example embodiment in, an open position.
Figure 7:
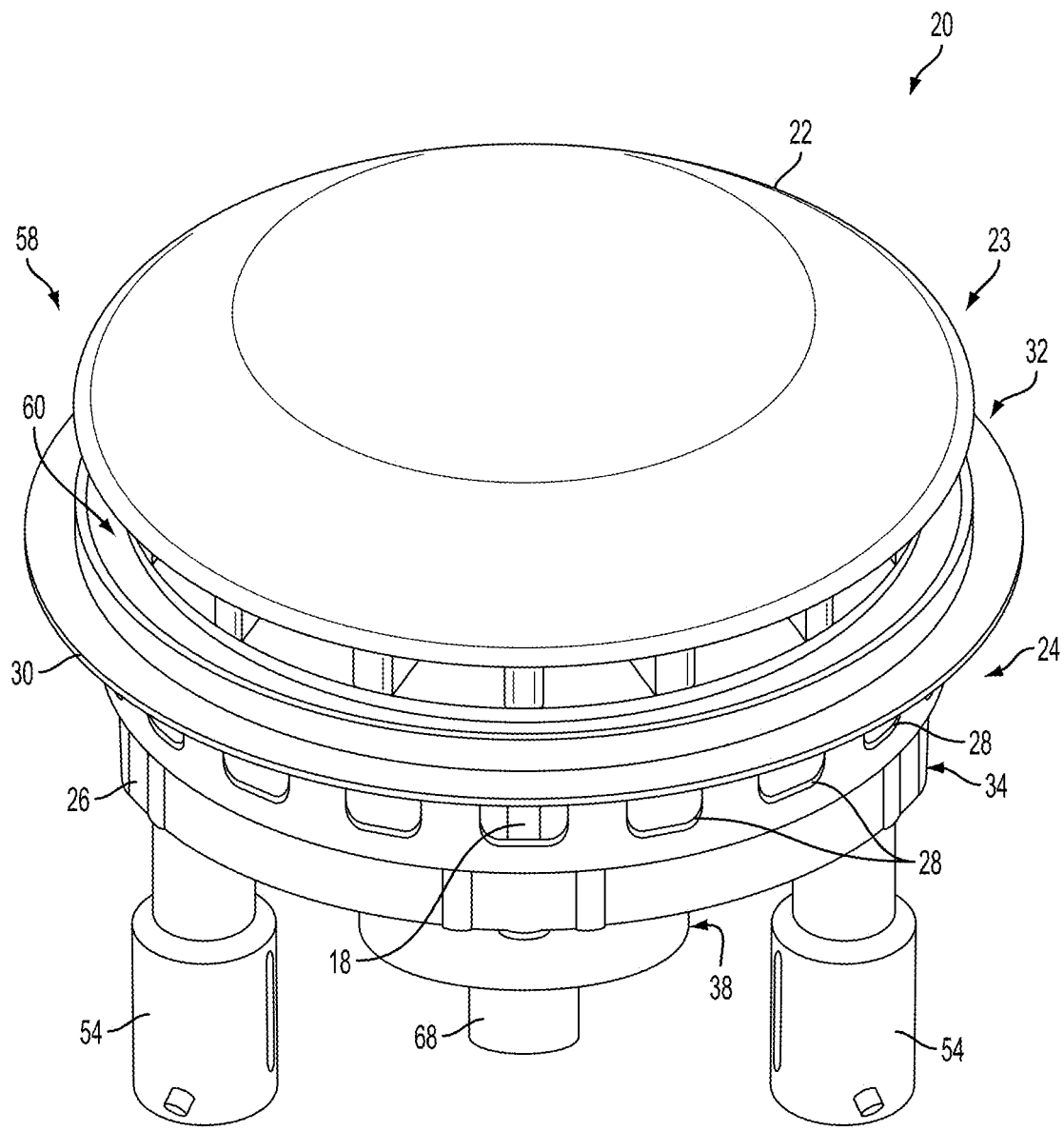
FIG. 7 shows a perspective view of the top of the air mass fill and release mechanism shown in FIGS. 4-6, according to an example embodiment in an open position.

In one embodiment, the fixed housing 24 comprises an open-ended, hollow cylinder 26 defining a first plurality of vents 28 in the cylindrical sidewall 26. The cylindrical sidewall 26 may have a uniform diameter along its length. Alternatively, as shown in FIG. 4, the portion of the fixed housing that defines a first plurality of vents 28 may have a larger diameter than the remaining portion of the fixed housing. In one embodiment, the first plurality of vents 28 is arranged in an annular configuration, as shown. The fixed housing 24 further defines a flange 30 that extends radially outward from the cylindrical sidewall 26. The air mass fill and release mechanism 20 is positioned beneath the balloon envelope 12 and the bladder 14 such that the flange 30 of the fixed housing 24 is secured to the balloon envelope 12. Further, as shown in FIGS. 5-8, the fixed housing 24 has an open first end that has a periphery 32 and a closed second end 34 that defines an aperture 36. In one embodiment, the bottom side of the closed second end 34 may be reinforced with a plurality of ribs 35.

Figure 9:
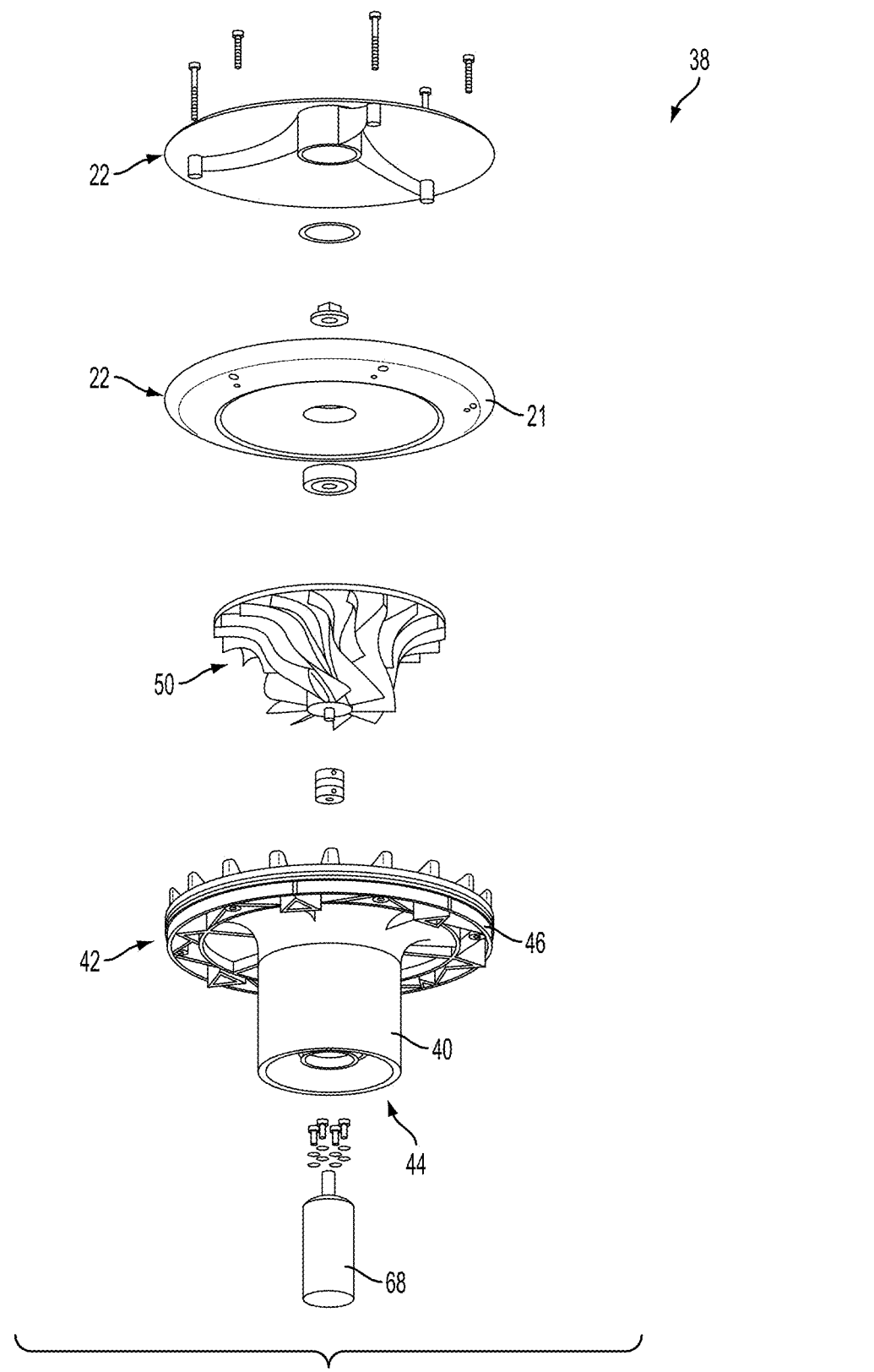
FIG. 9 shows an exploded view of a plate, an impeller and an impeller housing, according to an example embodiment.

In another embodiment, the impeller housing 38 is partially disposed within the fixed housing 24 and extending through the aperture 36 of the fixed housing 24. The impeller housing 38, shown in detail in FIGS. 9-11, comprises a hollow cylindrical body 40 with a first end 42 and a second end 44. A plate 22 having a periphery 23 is coupled to the first end 42 of the impeller housing 38. The plate 22 may comprise part of the impeller housing 38. In some embodiments, the plate 22 and the impeller housing 38 may be formed as a single unitary structure or may comprise multiple elements attached together. In one embodiment, a flange 46 extends radially outward from the impeller housing 38 below the plate 22. In a further embodiment, the bottom side of the flange 46 may be reinforced with a plurality of ribs 47. A second plurality of vents 48 are defined in the impeller housing 38 between the plate 22 and the flange 46. In one embodiment, the second plurality of vents 48 is arranged in an annular configuration, as shown. An airflow passageway is defined from the second end 44 of the impeller housing 38 through the hollow cylindrical body 40 of the impeller housing 38 to the second plurality of vents 48. An impeller 50, for example, is disposed within the impeller housing 38 between the first end 42 and the second end 44 of the impeller housing 38.

One or more actuators 52 are in mechanical communication with the flange 46 of the impeller housing 38. In alternative embodiments, a plurality of actuators may be utilized, where the plurality of actuators are evenly spaced apart from one another around the flange 46. Example actuators 52 include linear actuators such as piezoelectric motors, servomotors, and solenoids. In various other embodiments, shape memory alloy actuators may be utilized. The actuators 52 are each optionally disposed within actuator housings 54. In various embodiments, the actuator housings 54 are coupled to the closed second end 34 of the fixed housing 38. Each actuator 52 extends from its respective actuator housing 54 through the closed second end 34 of the fixed housing 24 to the flange 46 of the impeller housing 38.

The impeller housing 38 is moveable relative to the fixed housing 24 by the one or more actuators 52. Specifically, the plate 22 is movable from a closed position 56 to an open position 58. In the closed position 56, shown in FIG. 5, the periphery 23 of the plate 22 mates with the periphery of the first end 32 of the fixed housing 24 to form an airtight seal preventing air from entering or escaping from the balloon's bladder 16. In the open position 58, shown in FIG. 6, the plate 22 and at least a portion of the second plurality of vents 48 extend into the balloon envelope 12 providing fluid communication between atmosphere and the balloon's bladder 16 via the airflow passageway.

When a processor 312, for example, determines that the air mass in the bladder 16 requires adjustment, the processor 312 causes the impeller 50 to spin. Once the impeller 50 reaches the appropriate operating speed, the processor 312 sends a signal causing the actuators 52 to be activated. The appropriate air pressure generated by the impeller 50 within the housing 38 to provide suitable air flow into the bladder 16 and to counteract backpressure from the air mass in the bladder 16 will vary depending on the altitude of the balloon. One working example provides that at 4000 Pascals of altitude pressure, generating 800 Pascals of pressure via the impeller 50 will provide about 5 g/s of air mass flow. In one embodiment, the impeller 50 may generate maximum pressure ratio of altitude pressure to impeller generated air pressure of 1.2. The actuators 52 then advance the impeller housing 38, and therefore the plate 22, into the balloon envelope 12 opening the airflow passageway between the balloon's bladder 16 and the atmosphere. The actuators maintain a holding force while the impeller housing is in the open position 58. When air has been transferred into or out of the balloon bladder 16, the actuators 52 may receive a signal to return the impeller housing 38 to the closed position 56. Alternatively, the holding force of the actuators 52 may be deactivated and the force of the air mass may return the impeller housing 38 to the closed position 56 with the periphery 23 of the plate 22 sealed against the periphery of first end 32 of the fixed housing 24.

In some embodiments, when the air mass is being decreased and air is exiting the bladder 16, the impeller 50 may spin in reverse or forward generating mechanical energy and an energy conversion device may be utilized to convert that mechanical energy into electrical energy to power this or other systems carried on the payload 14 or the balloon envelope 12. In some embodiments, the same electronics used to drive the motor 68 may also be designed to recapture energy.

In another embodiment, a plurality of shoulder bolts 18, each with a threaded end and a shoulder end, extend through a plurality of bores 19 defined in the closed second end 34 of the fixed housing 24. The threaded ends of the shoulder bolts 18 are secured to the flange 46 of the impeller housing 38. This arrangement allows the shoulder bolts 18 to act as guides to maintain alignment of the impeller housing 38 relative to the fixed housing 24 when the impeller housing 38 is moved between the open 56 and closed positions 56. The plurality of shoulder bolts 18 are preferably evenly spaced from each other. The number of shoulder bolts utilized may range from four to twelve bolts and preferably six bolts.

In a further embodiment, the air mass fill and release mechanism 20 includes a gasket 60 disposed between the first end 32 of the fixed housing 24 and the first end 42 of the impeller housing 38. For example, a gasket 60 may be attached to an inner wall of the fixed housing 24 between the first end 32 of the fixed housing 24 and the first plurality of vents 28. In the open position 58, the gasket 60 creates a seal between the fixed housing 24 and the flange 46 of the impeller housing 38. This seal ensures that the only air flow passageway is defined from the second plurality of vents 48 through the impeller housing 38 and to the second end 44 of the impeller housing 38. Further, in the closed position 56, the gasket may seal against the plate 22 further aiding in creating an air tight seal between the periphery 23 of the plate 22 and the periphery of the first end 32 of the fixed housing 24.

In one embodiment, a bottom surface 21 of the plate 22 is convex. The convex nature of the plate 22 allows the outwardly extending gasket 60 to contact the plate 22 along a downwardly sloping face 21 in the closed position 58. Further, in another embodiment, the periphery 23 of the plate 22 may extend beyond the periphery of the flange 46 of the impeller housing 38.

Figure 8:
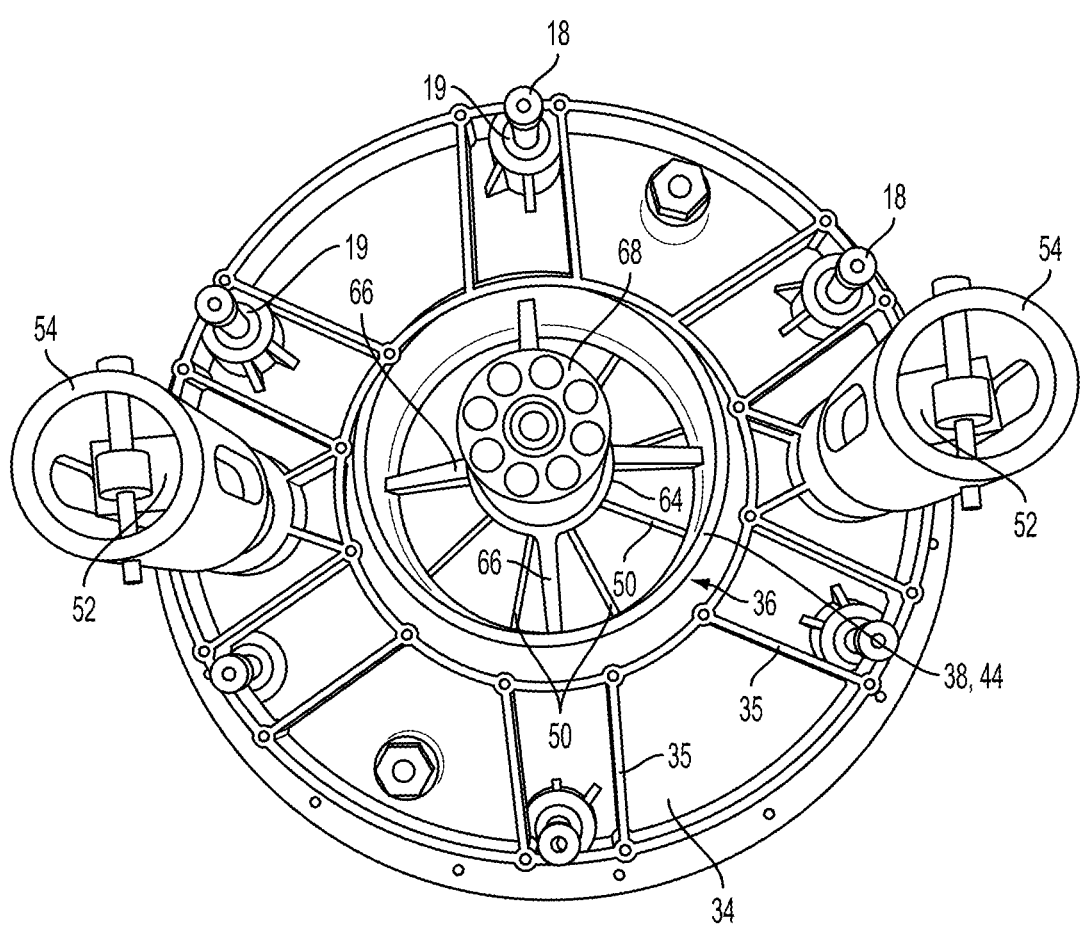
FIG. 8 shows a bottom view of the air mass fill and release mechanism shown in FIGS. 4-7 with a motor disposed within a receptacle at the second end of the impeller housing, according to an example embodiment.
Figure 10:
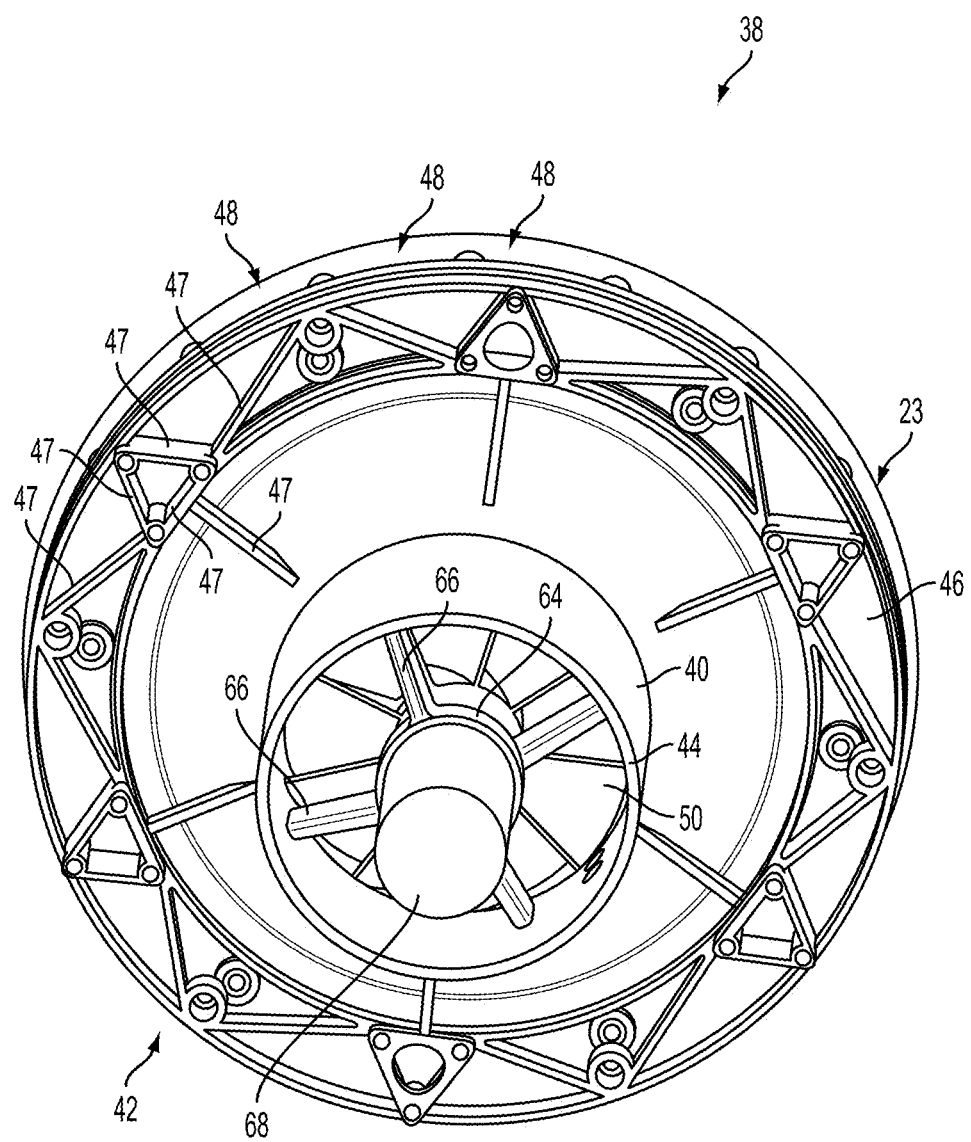
FIG. 10 shows a perspective view of the bottom of the impeller housing with an impeller disposed therein and a motor disposed within a receptacle at the second end of the impeller housing shown in FIG. 9, according to an example embodiment.
Figure 11:
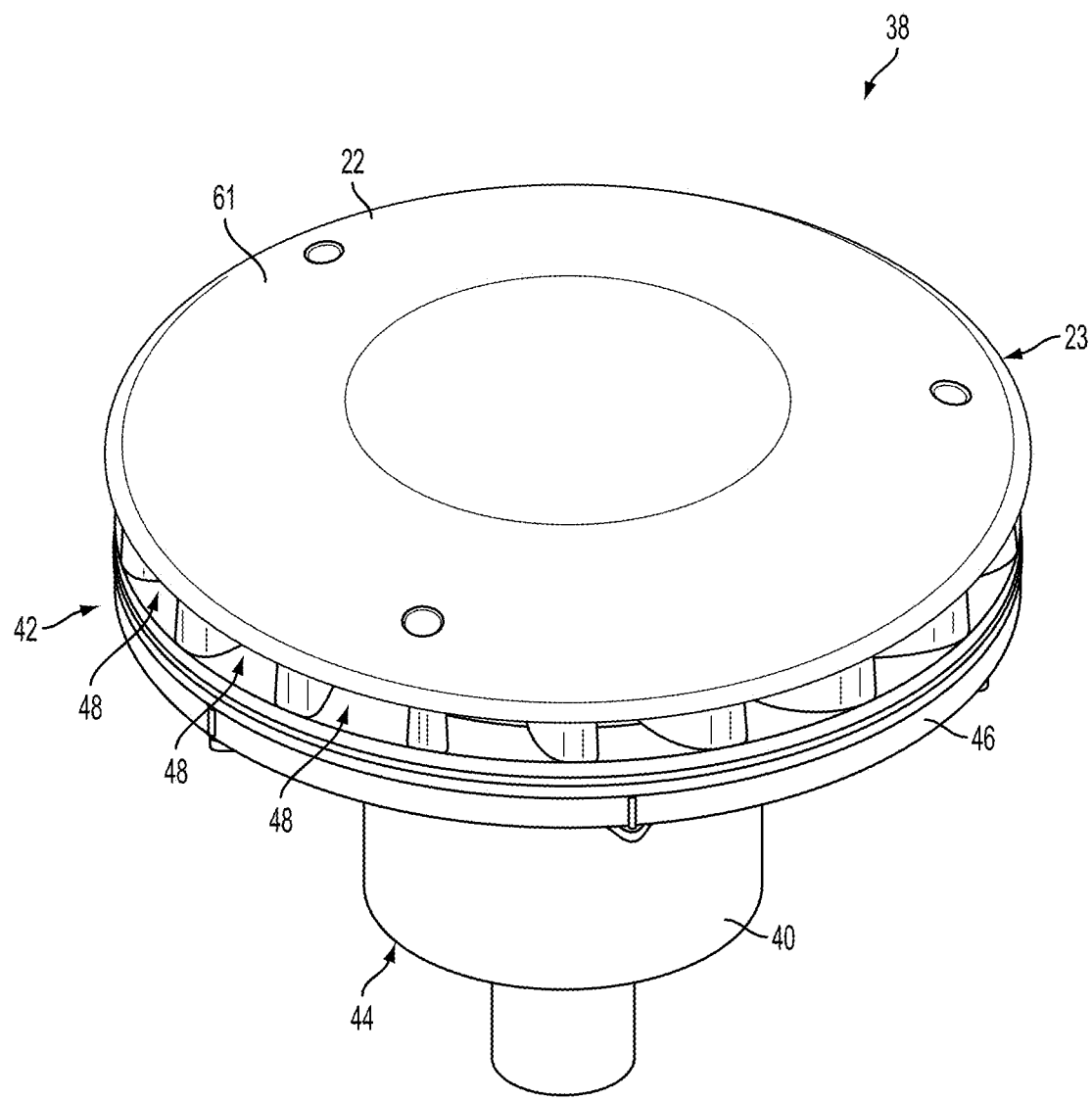
FIG. 11 shows a perspective top view of the plate, impeller housing and plate shown in FIGS. 9-10, according to an example embodiment.

In one embodiment, a motor 68 for driving the impeller 50 is received in the second end 44 of the impeller housing 38. In a further embodiment, shown in FIGS. 8 and 10, the second end 44 of the impeller housing 38 defines a receptacle 64 supported by a plurality of struts 66 extending from the receptacle 64 to an inner surface of the impeller housing 38. The motor may be received in receptacle 64 as shown in FIGS. 8 and 10. During the air mass exchange, air flows around the plurality of struts 66 through the air flow passageway.

Further, the structure of the fixed and impeller housings 24, 38 have the added benefit of being capable of being made out of plastic in some embodiments, unlike other high-speed air compressors. For example, the fixed and impeller housings 24, 38 may be made from acrylonitrile butadiene styrene (ABS), low-density polyethylene (LDPE), high-density polyethylene (HDPE) or polyether ether ketone (PEEK). Plastic compressors contract at a different rate than aluminum compressors at low temperatures. Thus, manufacturing both the fixed housing 24 and impeller housing 38 from plastic allows for a tight fit with one another, without having to remove some material to account for operating temperatures. Alternatively, in various other embodiments, the fixed or impeller housings may be made out of aluminum using conventional manufacturing techniques.

The air mass fill and release mechanism 20 provided herein utilizes the impeller 50 or pump only intermittently to adjust the air mass within the balloon 10. This intermittent use allows the balloon 10 to conserve power. In addition, the impeller housing 38 creates efficiencies in air flow by providing both an airflow seal and an unobstructed airflow passageway between the balloon envelope 12 and the atmosphere. As air flows out, the impeller 50 may spin in the reverse direction and this mechanical energy may be advantageously captured by an energy conversion device in some embodiments. Further, the fixed and impeller housings 24, 38 may be manufactured out of plastic with a tight fit with one another and without having to remove some material to account for variations in operating temperatures. In addition, the altitude of the balloon 10 may be effectively reduced by adding air mass to the balloon 10 without the venting of lifting gas.

4. Illustrative Methods

Figure 12:
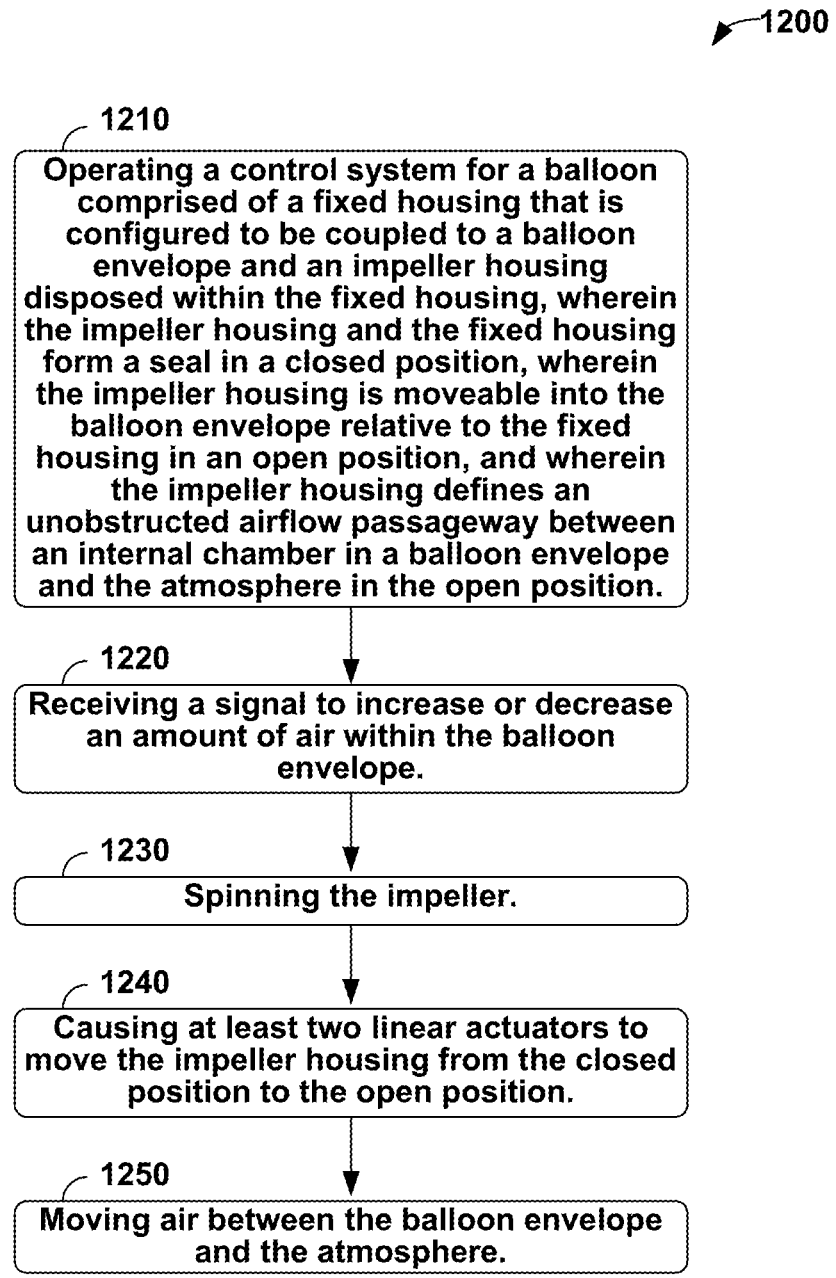
FIG. 12 is a method, according to an example embodiment.

FIG. 12 is a flowchart of a method 1200 that is provided that includes the step 1210 of operating a control system for a balloon comprised of a fixed housing that is configured to be coupled to a balloon envelope and an impeller housing disposed within the fixed housing, wherein the impeller housing and the fixed housing form a seal in a closed position, wherein the impeller housing is moveable into the balloon envelope relative to the fixed housing in an open position, and wherein the impeller housing defines an unobstructed airflow passageway between an internal chamber in a balloon envelope and the atmosphere in the open position.

Method 1200 further includes the step 1220 of receiving a signal to increase or decrease an amount of air within the balloon envelope, as well as the step 1230 of spinning the impeller. Method 1200 also includes the step of 1240 of causing one or more actuators to move the impeller housing from the closed position to the open position, and the step 1250 of moving air between the balloon envelope and the atmosphere.

In a further embodiment, method 1200 may further include the step of moving air into the balloon envelope, the step of receiving a signal that the balloon envelope contains the desired amount of air and the step of causing one or more actuators to move the impeller housing from the open position to the closed position.

In another embodiment, method 1200 may also include the step of stopping the impeller, the step of moving air out of the balloon envelope and the step of spinning the impeller in a reverse direction via air exiting the balloon envelope. In still another embodiment, the method 1200 may further include the step of converting mechanical energy generated by the impeller spinning in a reverse direction into electrical energy.

In an additional embodiment, the method 1200 may further include the step of air flowing radially out of the fixed housing through the first plurality of vents and air flowing out through the second end of the impeller housing, when the impeller housing is in the closed position.

In a further embodiment, the method 1200 may further include the step of air flowing out of the impeller housing and into the balloon envelope via the airflow passageway. In a still further embodiment, the method 1200 may further include the step of the impeller spinning at a pre-determined operating speed prior to causing the one or more actuators to move.

In yet another embodiment, the method 1200 may further include the steps of (a) determining a target speed for the impeller based on pressure, mass or density of air in a balloon envelope, (b) in response to determining a target speed, spinning the impeller while the impeller housing is in the closed position, (c) the impeller reaching the target speed, and (d) in response to the impeller reaching the target speed, moving the impeller housing into the open position

5. A Non-Transitory Computer Readable Medium with Instructions to Cause the Outlet Ports to be in an Open or Closed State Some or all of the functions described above and illustrated in FIGS. 4-12 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 312 illustrated in FIG. 3. Alternatively, the computing device that executes the stored instructions could be another computing device, such as a server in a server network, or a ground-based station.

The non-transitory computer readable medium may store instructions executable by the processor 312 to perform various functions. The functions could include causing the outlet ports to move from a closed position to an open position, and vice versa.

6. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
 a first housing that is securable to an envelope having;
 an impeller housing comprising an impeller, wherein the impeller housing is at least partially disposed within the first housing, wherein the impeller housing comprises one or more vents disposed along an outer surface of the impeller housing, and wherein the impeller housing is moveable relative to the first housing between a first position and a second position in order to allow fluid to flow into and out of the impeller housing via the one or more vents; and
 an energy conversion device configured to convert mechanical energy generated by the impeller into electrical energy.

2. The system of claim 1, further comprising a balloon including the envelope.

3. The system of claim 2, wherein the envelope includes at least one system of the envelope arranged to use the electrical energy generated by the impeller.

4. The system of claim 2, wherein the balloon further includes a payload having at least one system arranged to use the electrical energy generated by the impeller.

5. The system of claim 1, further comprising a motor configured to drive the impeller.

6. The system of claim 1, wherein the system is configured such that the electrical energy can be used to power movement of the impeller housing between the first position and the second position.

7. The system of claim 1, wherein the impeller is configured to rotate as gas from the envelope passes through the impeller housing in order to generate the mechanical energy.

8. The system of claim 1, further comprising the envelope, wherein the impeller housing is in the first position, the first housing obstructs any fluid communication between an interior chamber of the envelope and an area external to the envelope.

9. The system of claim 8, wherein in the second position the first housing provides fluid communication between the interior chamber of the envelope and an area external to the envelope.

10. The system of claim 9, wherein the interior chamber of the envelope is a ballonet of the envelope, such that the envelope is configured to hold lift gas between the envelope and the ballonet and ballast within the ballonet.

11. The system of claim 10, wherein the ballast includes air from the atmosphere.

12. The system of claim 1, further comprising one or more actuators configured to move the impeller housing between the first position and the second position, the one or more actuators being operable to activate a holding force that holds the impeller housing in the second position as gas flows between an interior chamber of the envelope and a passageway through the impeller housing.

13. The system of claim 12, wherein the one or more actuators are further configured to deactivate the holding force, and the impeller housing is configured to move into the first position in response to a deactivation of the holding force and a pressure from a mass of gas in the interior chamber, wherein when the impeller housing is in the first position, the first housing obstructs fluid communication between the interior chamber of the envelope and an area external to the envelope.

14. The system of claim 1, further comprising the envelope, and wherein the first housing includes a sidewall and a flange that extends outwardly from the sidewall, and the envelope is secured to the flange.

15. The system of claim 1, wherein the impeller housing includes a body and a plate, the plate being disposed on an upper end of the body, the one or more vents disposed along a periphery of the body, the plate including an upper surface and a bottom surface, the upper surface facing an interior chamber of the envelope, the bottom surface being opposite the upper surface, and the one or more vents being disposed on a side of the plate corresponding to the bottom surface.

16. The system of claim 15, wherein when the impeller housing is in the first position, the plate and the one or more vents extend from the first housing into the interior chamber of the envelope such that the one or more vents open a passageway to the interior chamber of the envelope, and when the impeller housing is in the first position, the bottom surface of the plate engages an upper surface of the first housing to seal the one or more vents inside the first housing, wherein when the impeller housing is in the first position, the first housing obstructs fluid communication between the interior chamber of the envelope and an area external to the envelope.

17. The system of claim 16, wherein when the impeller housing is in the first position, the bottom surface of the plate engages a gasket disposed on an upper surface of the first housing to seal the one or more vents inside the first housing.

18. The system of claim 16, wherein the bottom surface of the plate has a convex profile that engages with an upper surface of the first housing when the impeller housing is in the first position.

19. The system of claim 16, wherein the first housing includes a sidewall and a flange that extends outwardly from the sidewall, the envelope being secured to the flange, and when the impeller housing is in an open position, the plate and the one or more vents extend from the fixed housing into the interior chamber of the envelope such that the one or more vents are further disposed between the plate and the flange.

20. The system of claim 1, further comprising a motor configured to drive the impeller, wherein the impeller housing includes a plurality of inwardly extending struts and a receptacle, the receptacle being supported by the plurality of struts and being configured to receive the motor.

* * * * *